US010440143B2

(12) United States Patent
Bentil et al.

(10) Patent No.: US 10,440,143 B2
(45) Date of Patent: Oct. 8, 2019

(54) CONTEXTUAL TRUST BASED RECOMMENDATION GRAPH

(71) Applicant: Rancard Solutions Holdings Limited, Port Louis (MR)

(72) Inventors: Ebo Edwandzi Bentil, Accra (GH); Ehizogie Binitie, Accra (GH)

(73) Assignee: Rancard Solutions Holdings Limited, Port Louis (MR)

( * ) Notice: Subject to any disclaimer, the term of this patent is extended or adjusted under 35 U.S.C. 154(b) by 349 days.

(21) Appl. No.: 15/387,563

(22) Filed: Dec. 21, 2016

(65) Prior Publication Data

US 2018/0176327 A1  Jun. 21, 2018

(51) Int. Cl.
*H04L 29/08* (2006.01)

(52) U.S. Cl.
CPC ............ *H04L 67/306* (2013.01); *H04L 67/10* (2013.01); *H04L 67/22* (2013.01)

(58) Field of Classification Search
CPC ..... H04L 67/10; H04L 67/1044; H04L 67/22; H04L 67/306; H04L 51/32

USPC ........................................................ 709/204
See application file for complete search history.

(56) References Cited

U.S. PATENT DOCUMENTS

| | | | | |
|---|---|---|---|---|
| 8,185,558 B1* | 5/2012 | Narayanan | ............... | H04W 4/21 707/798 |
| 8,572,129 B1* | 10/2013 | Lee | .......... | G06F 16/95 707/798 |
| 2009/0112989 A1* | 4/2009 | Anderson | ............... | G06Q 30/02 709/204 |
| 2011/0270774 A1* | 11/2011 | Varshavsky | ............ | G06Q 10/10 705/319 |
| 2013/0097056 A1* | 4/2013 | Sun | ......... | G06Q 10/00 705/26.35 |
| 2014/0337141 A1* | 11/2014 | Ghosh | ................... | G06Q 30/02 705/14.66 |

* cited by examiner

*Primary Examiner* — Ruolei Zong
(74) *Attorney, Agent, or Firm* — Troutman Sanders LLP; James E. Schutz; Christopher C. Close, Jr.

(57) ABSTRACT

A computer-implemented method for supplying a recommendation for an item. The method is performed by at least one processor. The method comprises a step of, upon receiving user information, providing user nodes, each representing one of a plurality of users of a social network.

19 Claims, 6 Drawing Sheets

CONTEXTUAL TRUST BASED RECOMMENDATION GRAPH

FIELD

The disclosed embodiments relate to recommendation generation and to recommender systems. More specifically, the disclosed embodiments relate to a method that leads to the formation of a graph which enables the generation of a recommendation of an item to a user based on trust of another user in the context of the recommendation.

BACKGROUND

Recommender systems seek to predict the 'rating' or the 'preference' that a user would give to an item. Two basic entities that are included in any recommender system are, on one hand, items like books, people to contact, songs, articles, merchandise, etc. and, on the other hand, users. Recommender systems typically need some input information on these entities such as demographic data of the users, item features, and users' ratings of the items. The ratings can be explicit or implicit, binary or on different scales.

For recommendations to work effectively, it is usually helpful that the recommender system has some knowledge about the user pertaining to their interests and preferences. Further, the recommender system should successfully link the available information about the user to the items on offer to make a recommendation. Finally, the user should understand or have some other basis for trusting the recommendations being made to him. A recommendation problem is to make a prediction of a user's ratings of unrated items and to recommend one or more items of relevance to the user.

At least six types of computer-supported recommender systems can be identified:

1) Content-based systems recommend items that are similar to the items the focal user liked in the past.

2) Collaborative filtering systems recommend items to a particular user based on the ratings of users who show similar tastes for the same items.

3) Item-based collaborative filtering or item-by-item collaborative filtering.

4) Demographic filtering categorizes users according to demographic data and generates recommendations based on demographic classes.

5) Average ratings are non-personalized recommendations based on what other users have said about the items on average.

6) Recommendation support systems are systems that do not automate the recommendation process but support people in sharing recommendations. These are typically non-personalized recommendations.

The first major problem in conventional recommender systems is the cold start problem and the long tail problem. These systems can not recommend items not yet rated. Many items in catalogs are found to have insufficient or inadequate ratings so they are either rarely recommended or never recommended to users.

The second major problem of recommender systems is the lack of novelty and serendipity. Content-based filtering recommends similar items, which usually means that it does not provide any radical change in the types of items recommended to users, while collaborative filtering generally recommends very popular items to anyone.

The start-up or new user problem is considered to be the third major problem of recommender systems. New users of a system have few or no ratings of items that can be used to determine similar items or similar users needed to provide recommendations in content-based and collaborative filtering systems.

The recommendation system enabled by embodiments are designed to address the above-mentioned problems of cold start, lack of novelty and new users.

SUMMARY

The following presents a simplified summary in order to provide a basic understanding of some aspects embodiments described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

According to an embodiment, a computer-implemented method of supplying a recommendation for an item is provided. The method is performed by at least one processor. The method comprises the step of, upon receiving user information, providing user nodes, each representing one of a plurality of users of a social network. A further step is, upon receiving data that a first user knows a second user, providing a knows arc between the user nodes. Upon receiving data that a first user has trust in a second user with respect to a genre, the following is provided: a trust node, a trust arc of a first type from the first user to the trust node, a trust arc of a second type from the trust node to the second user and a trusted-genre arc from the trust node to a genre node. Thereby, the genre node presents the genre. Upon receiving data that an item belongs to a genre, a genre arc from an item node to the genre node is provided, the item node representing the item.

Upon receiving recommendation data indicating a first recommendation or high-rating of an item of a first genre from a second of the plurality of users, the first recommendation being not directed to a first of a plurality of users, a second recommendation for the item to the first of the plurality of users is generated.

According to a further embodiment, one or more computer-readable non-transitory storage media embodying software embodying software are disclosed. The media comprises instructions operable when executed to provide the steps of the above-described method.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

The accompanying drawings, which are incorporated in and constitute a part of the specification, illustrates the disclosed subject matter and, together with the description, serves to exemplify the principles of the disclosed embodiments.

DETAILED DESCRIPTION

All patents, patent applications and literatures cited in this description are incorporated herein by reference in their entirety.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
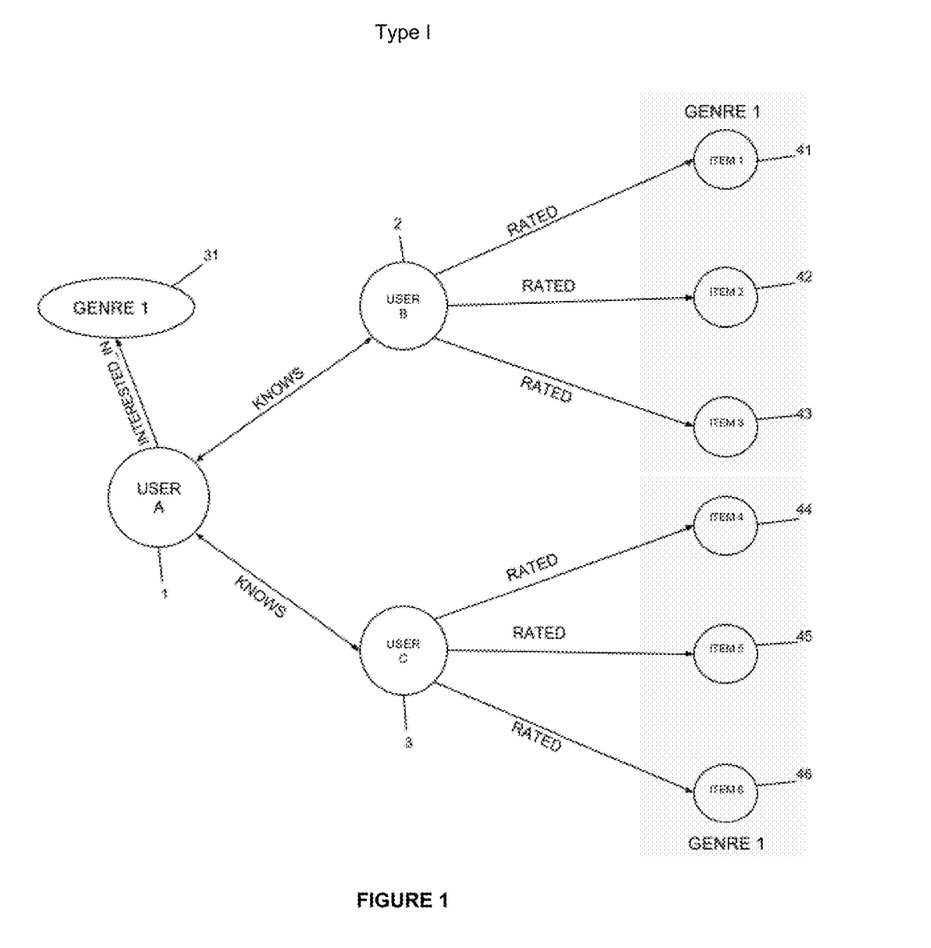
FIG. 1 shows a diagram with elements of a graph, according to a first embodiment, which enables a recommender system to generate recommendations.

FIG. 1 illustrates a diagram showing elements of a graph which enables a recommender system to generate one or more recommendations to users. The graph comprises a first user node 1 for a first user A, a second user node 2 for a second user B and a third user node 3 for a third user C. The graph further comprises six items with the item nodes 41, 42, 43, 44, 45 and 46 and a genre node 31 representing a first genre. A first bidirectional knows arc is provided between the user nodes 1 and 2 and a second bidirectional knows arc is provided between the user nodes 1 and 3. Each of three rating arcs leads from the user node 2 to one of the item nodes 41, 42 and 43. Each of three other rating arcs leads from the third user node 3 to one of the item nodes 44, 45 and 46. An interested_in arc leads from the first user node 1 to the genre node 31. Six genre arcs that each starts in one of the item nodes 41 to 46 and ends in the genre node 31 are not shown.

The method provides the following function. Assuming a user A knows a user B, user B knows user A, and users A and C know each other. User B has rated three items of genre 1 high and user C has also rated three items of the same genre 1 high. As user A has previously indicated interest in genre 1, trust is inferred between user A and user B and between user A and user C. This leads to the formation of a social recommendation molecule, so that items, rated by users B and C and which user A has not interacted with or rated, will be recommended by the recommender system to user A.

The item may be e.g. a product, a content item or a service. In this context, a recommendation is the high rating that may not be addressed to a specific person.

Figure 2:
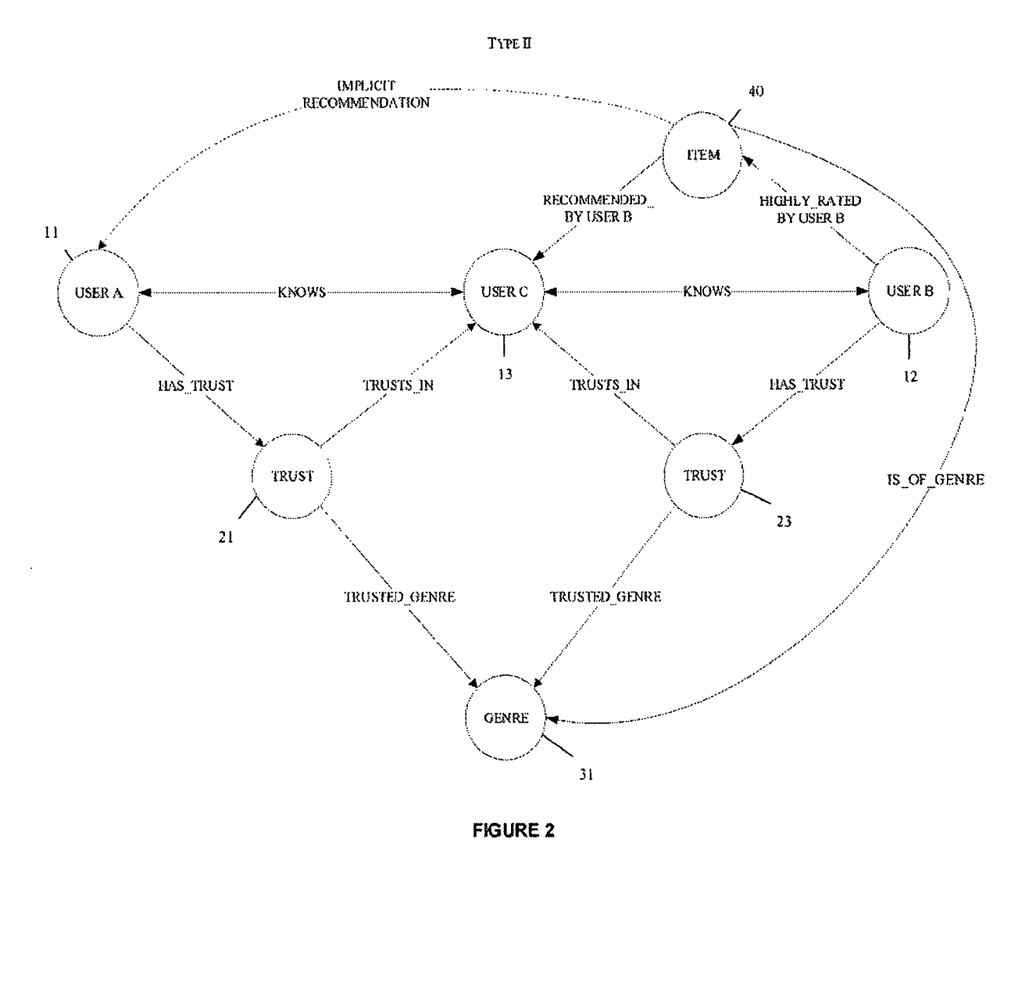
FIG. 2 shows a diagram with elements of a graph, according to a second embodiment, which enables a recommender system to generate recommendations.

FIG. 2 illustrates a diagram showing a graph of a second embodiment, which enables a recommender system to generate a recommendation according to a second type. The graph comprises a first user node 11 representing a first of a plurality of users A, a second user node 12 for a second of the plurality of users B and a third user node 13 for a third of the plurality of users C. The graph further comprises one item node 40 representing an item that may be a product or a service and comprises a genre node 31 representing a first genre. A first bidirectional knows arc is provided between the user nodes 11 and 13 and a second bidirectional knows arc is provided between the user nodes 12 and 13. These knows arcs are provided based on the information that the users A and C know each other and the information that users B and C know each other.

A genre arc starts in the item node 40 and ends in the genre node 31. A first trust node 21 is the starting node for a first trusted-genre arc that ends in the genre node 31, while, in a second trust node 23, a second trusted-genre arc starts to also end in the genre node 31. A first set of trust arcs connects the first user node 11 with the third user node 13 through the first trust node 21. Thereby, the first set of trust arcs comprises a directed arc of the first type from the first user node 11 to the first trust node 21 and a directed trust arc of the second type from the first trust node 21 to the third user node 13, representing trust of the first user A in the third user C.

A second set of trust arcs connects the third user node 13 with the second user node 12 through the second trust node 23. The second set of trust arcs comprises an arc of the first type from the third user node 13 to the second crust node 23 and trust arc of the second type from the second trust node 23 to the second user node 12, representing trust of the third user C in the second user B.

If the user A indicates trust in the user C in regard to a particular genre which may also be called domain, the user C also indicates trust in another user B with regard to the same genre and user B makes an explicit recommendation to user C of an item of the same genre, then a second recommendation is made to user A recommending the same item that user B recommended to user C, if also the following conditions are met: user A has not seen this item and user A has not already rated this item.

A first recommendation made by a user may be a recommendation of an item made to a specific user or may be a high rating that is not explicitly directed to a specific user.

The use of graphs for modeling a social network and for making the recommendations in these social networks provides an efficient basis for generating the recommendations generated by the system. Efficient means that less calculations and computing power are needed to determine the recommendations to be made. Especially, when graph oriented databases like the database Neo4j by Neo Technologies enable efficient search algorithms to search for parts of the graph where a recommendation may be generated. It is usually more efficient to follow graph structures rather than to calculate likelihoods by multiplying a plurality of factors.

Recommendations can be made to users for whom there is inadequate data on their interests/preferences, such as new users. The relevance of an item is determined from the breadth of the social index rather than from a wide range of popular product, content, and service catalogues. The users also get a sufficient basis to trust the recommendations provided. Recommendations can be made to users on items that have not been previously rated, which are typically newly introduced items.

Figure 3:
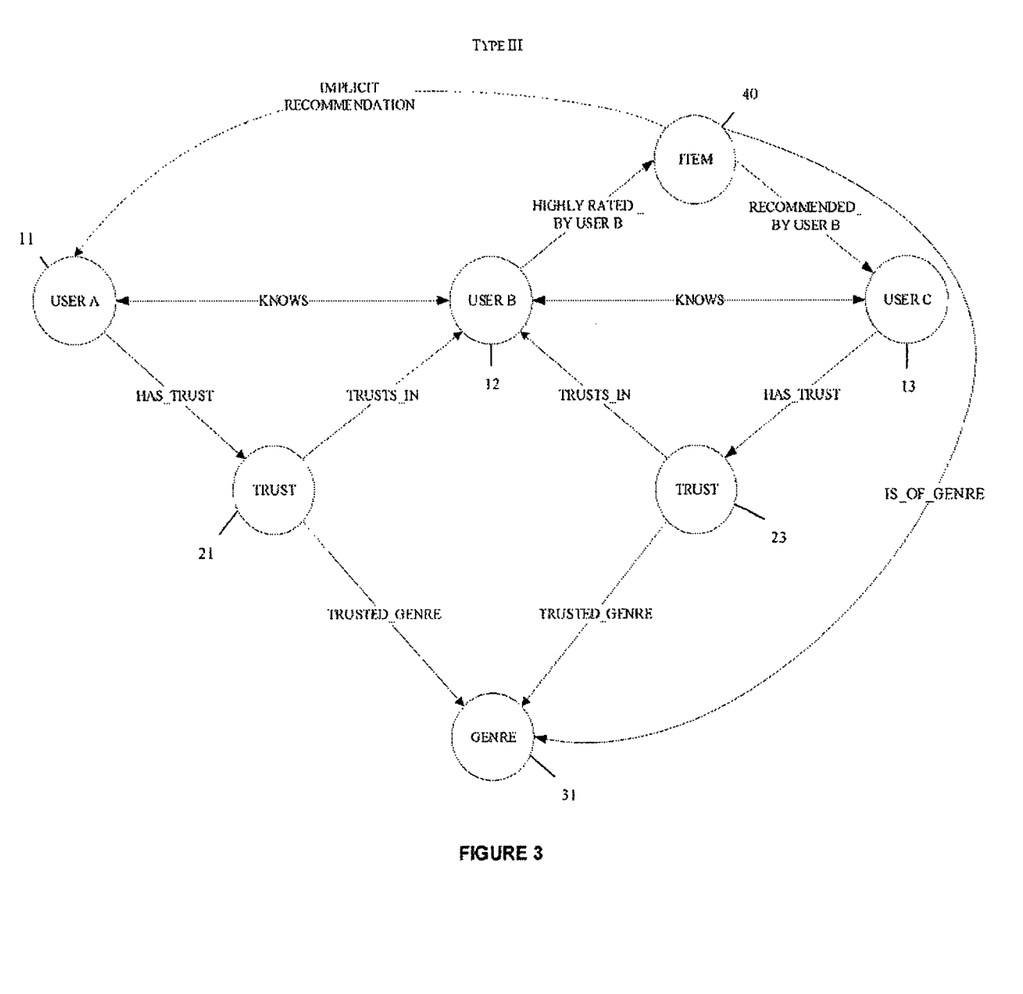
FIG. 3 shows a diagram with elements of a graph, according to a third embodiment, which enables a recommender system to generate recommendations.

FIG. 3 illustrates a diagram showing a graph which enables a recommender system to generate a recommendation according to a third type. The graph comprises a first user node 11 representing a first of a plurality of users A, a second user node 12 for a second of the plurality of users B and a third user node 13 for representing a third of the plurality of users C. The graph further comprises one item node 40 representing an item that may be a product or a service and comprises a genre node 31 representing a first genre. A first bidirectional knows arc is provided between the user nodes 11 and 12 and a second bidirectional knows arc is provided between the user nodes 12 and 13.

A genre arc starts in the item node 40 and ends in the genre node 31. A first trust node 21 is the starting node for a first trusted-genre arc that ends in the genre node 31, while, in a second trust node 23, a second trusted-genre arc starts to also end in the genre node 31. A first set of trust arcs connects the first user node 11 with a second user node 12 through the first trust node 21. Thereby, the first set of trust arcs comprises a directed arc of the first type from the first user node 11 to the first trust node 21 and a directed trust arc of the second type from the first trust node 21 to the second user node 12, representing trust of the first user A in the second user B.

A second set of trust arcs connects the second user node 12 with the third user node 13 through the second trust node 23. The second set of trust arcs comprises an arc of the first type from the third user node 13 to the second trust node 23 and trust arc of the second type from the second trust node 23 to the third user node 12, representing trust of the third user C in the second user B.

If a user A indicates trust in another user B with respect to a particular genre and another user C also indicates trust for user B on the same genre and user B explicitly recommends an item of the same genre to user C, the item will be recommended to user A.

In an embodiment, a further condition to be met for generation of the recommendation is that user A has not previously interacted or rated this item.

Figure 4:
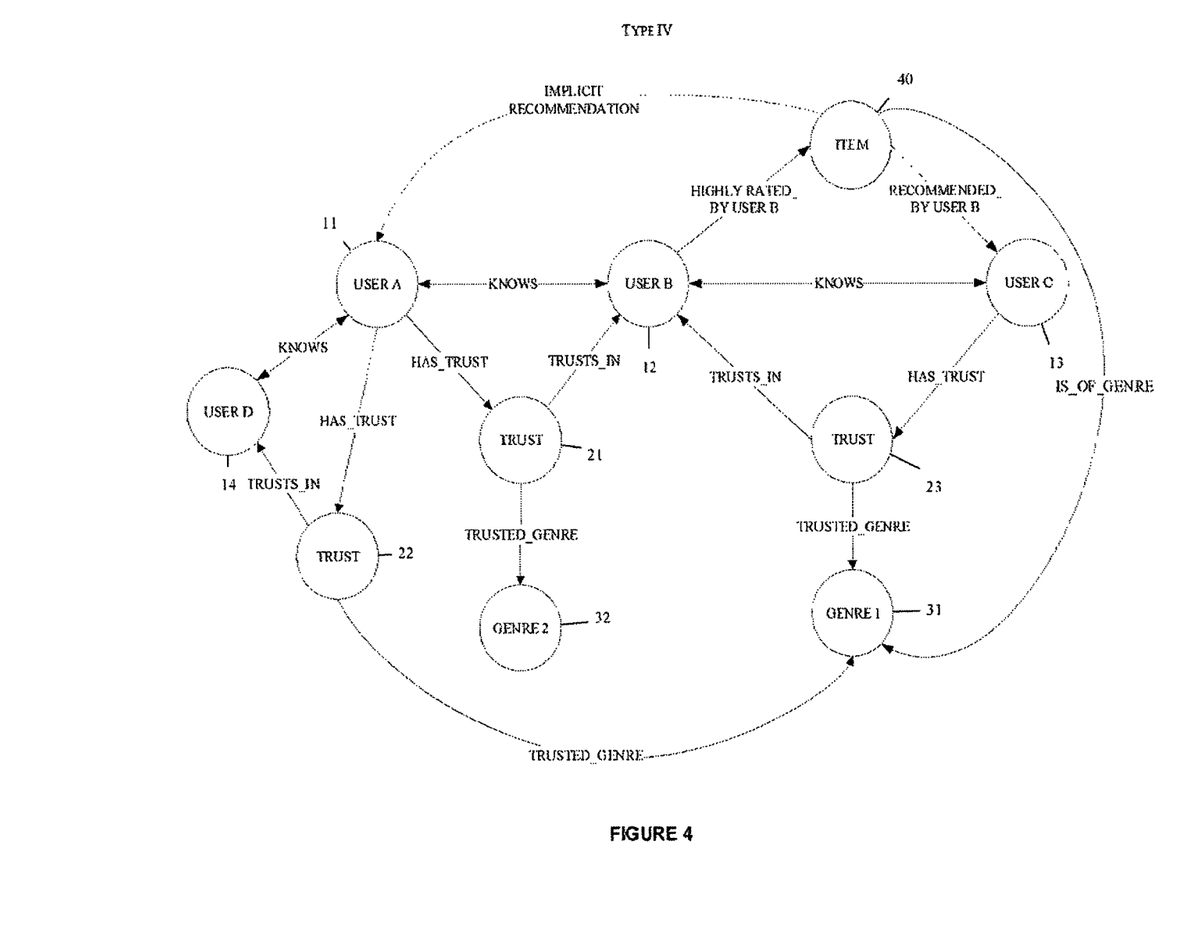
FIG. 4 shows a diagram with elements of a graph, according to a fourth embodiment, which enables a recommender system to generate recommendations.

FIG. 4 illustrates a diagram showing a graph which enables a recommender system to generate a recommendation according to a fourth type. The graph comprises a first user node 11 representing a first of a plurality of users A, a second user node 12 for a second of the plurality of users B and a third user node 13 for representing a third of the plurality of users C and a fourth user node 14 for representing a fourth of the plurality of users D. The graph further comprises an item node 40 representing an item that may be a product or a service and comprises a genre node 31 representing a first genre and a further genre node 32 representing a second genre. A first bidirectional knows arc is provided between the user nodes 11 and 12 and a second bidirectional knows arc is provided between the user nodes 12 and 13. A third bidirectional knows arc is provided between the user nodes 11 and 14.

A genre arc starts in the item node 40 and ends in the genre node 31. A first trust node 21 is the starting node for a first trusted-genre arc that ends in the genre node 32, while, in a second trust node 22, a second trusted-genre arc starts to end in the genre node 31 and a further trust node 23 is the starting point for a trusted-genre arc ending in the first genre node 31. A first set of trust arcs connects the first user node 11 with a second user node 12 through the first trust node 21. The first set of trust arcs comprises a directed arc of the first type from the first user node 11 to the first trust node 21 and a directed trust arc of the second type from the first trust node 21 to the second user node 12, representing trust of the first user A in the second user B.

A second set of trust arcs connects the second user node 12 with the third user node 13 through the second trust node 23. The second set of trust arcs comprises an arc of the first type from the third user node 13 to the second trust node 23 and trust arc of the second type from the second trust node 23 to the second user node 12, representing trust of the third user C in the second user B.

A further set of trust arcs connects the first user node 11 with the fourth user node 14 through the further trust node 22. The further set of trust arcs comprises an arc of the first type from the first user node 11 to the further trust node 22 and a trust arc of the second type from the further trust node 22 to the fourth user node 14, representing trust of the first user A in the fourth user D.

It is assumed that the user A indicates trust in user B on the genre 2 and user C also indicates trust for User B on another genre 1 and user A indicates trust in user D on genre 1. As user A has indicated trust in user B in respect to genre 2, when user B explicitly recommends an item of genre 1 to User C, the item will be recommended to user A, because User A has expressed his interest in genre 1 by explicitly indicating trust for another user D with respect to genre 1. In a further embodiment, further conditions to generate the recommendation are that user A has not seen the item recommended by user B to user C and user A has not already rated the item which user B recommends to user C.

Figure 5:
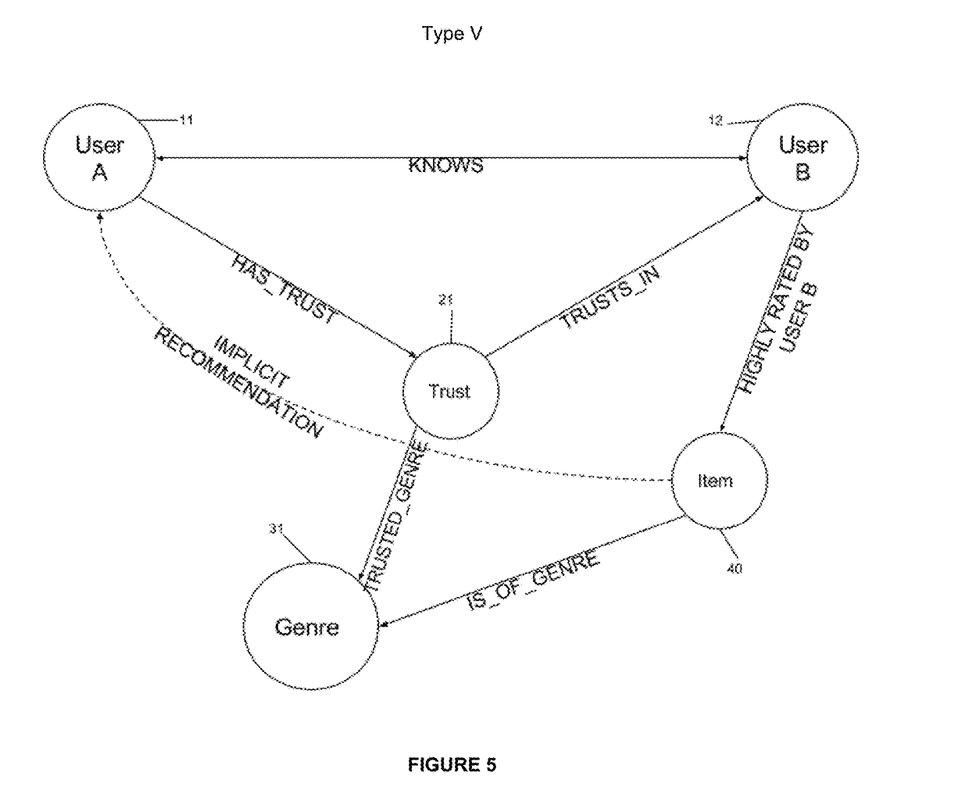
FIG. 5 shows a diagram with elements of a graph, according to a fifth embodiment, which enables a recommender system to generate recommendations.

FIG. 5 illustrates a diagram showing a graph which enables a recommender system to generate a recommendation according to a fifth type. The graph comprises a first user node 11 representing a first of a plurality of users A and a second user node 12 for a second of the plurality of users B. The graph further comprises one item node 40 representing an item that may be a product or a service and comprises a genre node 31 representing a first genre. A bidirectional knows arc is provided between the user nodes 11 and 12.

A genre arcs starts in the item node 40 and ends in the genre node 31. A trust node 21 is the starting node for a first trusted-genre arc that ends in the genre node 31. A set of trust arcs connects the first user node 11 with a second user node 12 through the first trust node 21. Thereby, the set of trust arcs comprises a directed arc of the first type from the first user node 11 to the first trust node 21 and a directed trust arc of the second type from the first trust node 21 to the second user node 12, representing trust of the first user A in the second user B.

If the user A indicates trust for the other user B on a particular genre and user B highly rates an item of this genre without directly recommending it to A, user A gets a recommendation generated by the recommender system. In a further embodiment, a further condition to be met for generating the recommendation is that user A has neither previously interacted nor rated this item.

Figure 6:
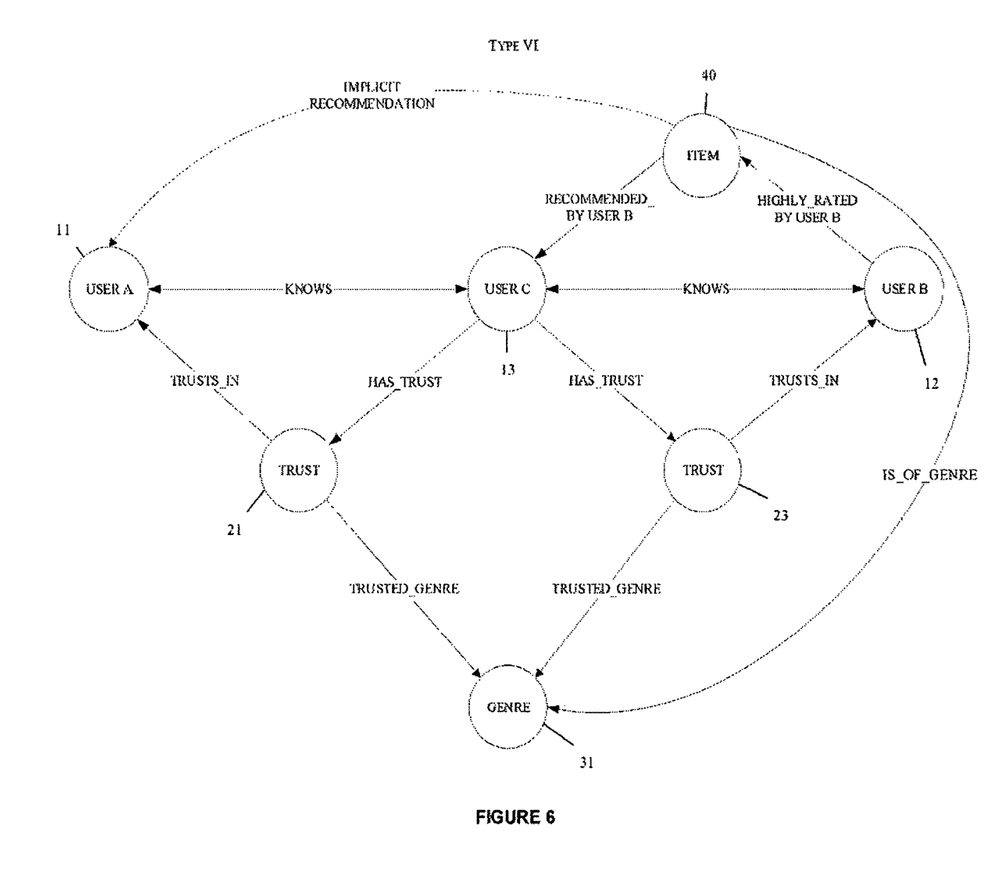
FIG. 6 shows a diagram with elements of a graph, according to a sixth embodiment, which enables a recommender system to generate recommendations.

FIG. 6 illustrates a diagram showing a graph which enables a recommender system to generate a recommendation according to a sixth type. The graph comprises a first user node 11 representing a first of a plurality of users A, a second user node 12 for a second of the plurality of users B and a third user node 13 for a third of the plurality of users C. The graph further comprises one the item node 40 representing an item that may be a product or a service and comprises a genre node 31 representing a first genre. A first bidirectional knows arc is provided between the user nodes 11 and 13 and a second bidirectional knows arc is provided between the user nodes 12 and 13.

A genre arc starts in the item node 40 and ends in the genre node 31. A first trust node 21 is the starting node for a first trusted-genre arc that ends in the genre node 31, while, in a second trust node 23, a second trusted-genre arc starts to also end in the genre node 31.

A first set of trust arcs connects the third user node 13 with the first user node 11 through the first trust node 21. Thereby, the first set of trust arcs comprises a directed arc of the first type from the third user node 13 to the first trust node 21 and a directed trust arc of the second type from the first trust node 21 to the first user node 11, representing trust of the third user C in the first user A.

A second set of trust arcs connects the third user node 13 with the second user node 12 through the second trust node 23. The second set of trust arcs comprises an arc of the first type from the third user node 13 to the second trust node 23 and trust arc of the second type from the second trust node 23 to the second user node 12, representing trust of the third user C in the second user B.

If a user C indicates trust in another user B with respect to a particular genre the same user C also indicates trust for user A on the same genre and user B explicitly recommends an item of the same genre to user C, the item will be recommended to user A.

In an embodiment, a further condition to be met for generation of the recommendation is that user A has not previously interacted or rated this item.

Social recommendations may be considered as any recommendations that are influenced by the behavior of other people within a user's social network. This social network may be very large and diffuse like the plurality of users interested in management books of a large online bookstore. In other circumstances, a social network may be relatively focused, e.g. a user's discussion group at a school.

The subsequent information set focuses on recommendations from friends and networks of friends, with friends defined as people who know each other or are considered to be familiar with each other and may share common interests. A direct recommendation from a friend may be considered as emanating from a trusted entity, because consequently the recommendation can also be trusted and assessed on the basis of knowledge that the friend has about the interests and leanings of the given user.

Of particular interest is the application of a social network data to filter the set of options available to a user and to give the user a basis for trusting the recommendations made, so that a user will even take the first step of trying them out.

A type of recommender system can be constructed where recommendations are derived primarily on the basis of ratings of items that exist within a social network comprising other users that a focal user is connected to, i.e. has relationships with. This type of recommender system may be described as a network-based recommender system.

A feature of network-based recommender systems may be that items are recommended not because of their features or because people similar to the focal user yielded positive ratings on them, but because people in the focal user's social network (i.e. friends or friends of friends) yielded positive ratings on them. For example, if person A trusts person B and B trusts person C, it is likely that items rated positively or liked by person C can be recommended to person A, even if person A and person C are not directly connected. This logic may be described part of social network filtering.

Embodiments of this disclosure provide recommendations by reducing some of the computational limitations of traditional recommender systems:

In respect to the cold start problem or respectively long tail problem it is still the case that an item that has not been rated, neither explicitly nor implicitly, cannot be recommended by the system. However, network-based recommender systems, rather than other systems, may include more items with fewer ratings in their recommendations if these items have been rated by trusted people.

With regard to lack of novelty respectively the serendipity problem, social-network based systems give users the possibility to get recommendations from unknown users, who are trusted by trusted friends, which may bring novel items into the recommendation list.

Due to the start-up problem, or respectively the new user problem, a new user entering a social network does not have existing item ratings and therefore is typically unable to get relevant recommendations with conventional recommender methods like collaborative filtering. If, however, a recommender system is based on the user's social network, once relationships to existing members are established, relevant recommendations can be made, even before the new user has rated any items.

In an embodiment, the methods described a type I to VI according to the FIGS. 1 to 6 are combined in one recommender system which may be provided as a computer program. Depending on the structure of the graph and the users' input, recommendations are provided by the system according to the type to which the user's input fits. E.g. if the second user makes a new recommendation, the relationships being represented by the graphs are checked. It may be possible that one recommendation expressed by the second user may concurrently lead to six recommendation according to type IV, two recommendations of type III and one recommendation of type II, depending on the connections of other users in the social network.

Further embodiments are described as following: A method is provided for making a recommendation to a User A connected in the graph to at least two other users, B and C, where User A shares an interest in a particular genre or context with users B and C. Given the common shared interest among users A, B and C, trust may be inferred in this method where user A and user B mutually know each other, and simultaneously User A and User C mutually know each other. The structure accordingly formed is one representation of a social recommendation molecule. This method comprises the steps outlined below where each user interacts with the graph via a computing or communications device:

a. User A imports a set of contacts into the graph in which for each contact a node is created in the graph, where it does not already exist, and a directed edge is added from the graph node representing user A to each contact node to indicate that A knows, or respectively has a relationship with, the contact.

b. User B imports a set of contacts into the graph where for each contact a node is created in the graph, where it does not already exist, and a directed edge is added from the graph node representing User B to each contact node to indicate that B knows the contact.

c. User C imports a set of contacts into the graph where for each contact a node is created in the graph, where it does not already exist, and a directed edge is added from the graph node representing user C to each contact node to indicate that C knows, or respectively has a relationship with, the contact.

d. Steps (a) and (b) result in a directed edge from User A to User B—based on successful execution of steps (a) and (b)—as well as a directed edge from User B to User A, if User A existed in the set of contacts imported by User B and User B existed in the set of contacts imported by User A.

e. Steps (a) and (c) result in a directed edge from User A to User C, based on successful execution of steps (a) and (c), as well as a directed edge from User C to User A, if User A existed in the set of contacts imported by User C and User C existed in the set of contacts imported by User A.

f. User A makes a positive rating of at least three items of a particular genre/context or otherwise indicates interest in the particular genre/context.

g. User B makes a positive rating of at least three items of the same genre/context as the items rated by User A.

h. User C makes a positive rating of at least three items of the same genre/context as the items rated by User A and User B.

i. Where steps (a) through (h) have happened in the course of typical user actions performed during interactions with any member of a plurality of applications or services engaged through a computer or communications system, a graph structure is created from which a social recommendation can be realized.

j. If any of the items rated by Users B and C as per steps (g) and (h) has not previously been encountered by User A, those items are recommended is to User A.

k. If User A demonstrates that the recommendation being served in this way was relevant, the demonstration is made via a corresponding action such as positively rating the item or purchasing the item, such action is interpreted to be confirmation of the trust inferred between user A and whichever user B or C that yielded the recommendation.

A further embodiment relates to a method for creating a graph representation of context-based trust, e.g. for products, content, or services, resulting in what is called a social recommendation molecule among users in a social network, constructed in a manner such that recommendations can be yielded for different users within the social network by simply parsing the graph consisting of social recommendation molecules. This method comprises the steps outlined below where each user interacts with the graph via a computing or communications device:

a. A user, the requesting user, selects persons from their list of contacts being people whom they know or to whom they are familiar with.

b. Each Contact selected is represented in the graph structure by a node which is created in the graph, where it does not already exist, corresponding to the contact's unique identifier such as a phone number, email address, identifier for an online service or any other unique identifier obtained through the contact's data provided.

c. A directed edge connects the requesting user's node to each node in the graph representing a selected contact of the requesting user to indicate that the requesting user knows the contact.

d. The requesting user indicates that he trusts a contact, the recommending user, on a particular context or genre of items from which the requesting user would want to receive recommendations of relevant items made by the contact respectively the recommending user.

e. The request for recommendations per indicative context or genre is delivered to the recommending user via a computer system or network of computer systems or other communications system.

f. The recommending user responds to the request for recommendations by making a selection from a catalogue of items within the context or genre indicated by the requesting user g. The selection of potentially relevant items constituting a social recommendation by the recommending user is written to a data store on a computer system h. A trust node, a graph node representing trust, is created in the graph and a directed edge is added from the trust node to a node representing the context or genre indicated by the requesting user in step (d) where it does not already exist. A directed edge is then added from the requesting user to the trust node and another directed edge added from the trust node to the recommending user. This sequence of connections from the requesting user to the recommending user determines a trust line.

i. The action of selecting a subset of items is interpreted asto mean the recommending user has made high positive ratings of those items out of all the items in the catalogue provided in step (f) and these are represented in the graph in the following manner:

I. A node having been created in the graph representing each item in the catalog II. An edge is added in the graph from the node representing the recommending user to the node representing the item in sub-step (I)

III. The edge in sub-step (II) is labeled with a rating indication or a weighting representing the recommending user's assessment of the relevance of that item.

The above-described method according to steps a. to i. may be specified by the condition that where the identity of the Recommending User is not known to the graph, consequently a trust line is not created in the graph between the requesting user and the recommending user until the recommending user has responded to the request as indicated in step (d) and deliberately reveals his/her identity to the graph The above-described method according to steps a. to i. may be specified by the condition that where the identity of the recommending user is not known, consequently a trust line is not created in the graph database between the requesting user and the recommending user until the recommending user has responded to the request as indicated in step (d) and reveals his/her identity by responding to the request According to a further embodiment, a method is provided for making a recommendation to a user A connected in the graph to another user B via a trust line in a particular genre or context in which a recommendation is made to user A as a result of user B's high positive rating of an item in the genre or context that user A trusts in user B. This method comprises the steps outlined below where each user interacts with the graph via a computing or communications device:

a. User A explicitly indicates his trust in User B on a particular genre or confirming inferred trust for User B b. User B makes a high positive rating of an item of the same genre or context for that User A trusts him, either independently or in response to a request from user A or another user in the graph.

c. The item rated highly by user B is served as a recommendation to user A.

The above-described method according to steps a. to c. may be specified by the condition that a recommendation is made to a user A if a user B, connected to user A in the graph via a trust line in a particular genre or context, takes an action which is an indication of a high positive rating of an item in that particular genre or context.

According to a further embodiment, a recommendation is made to a user A connected in the graph to another user B via a trust line in a particular genre or context and user B is also connected to a user C via another trust line in the same genre or context the user A trusts the user B. When user C explicitly recommends an item within the genre or context of trust to user B, the same item will be recommended to user A. This method comprises the steps outlined below where each user interacts with the graph via a computing or communications device:

a. User A explicitly indicates his trust in User B on a particular genre or confirming inferred trust in user B b. User B explicitly indicating their trust for User C on a particular genre or confirming inferred trust in user C c. A trust node is created in the graph and a directed edge drawn to a node representing a particular context or genre which may already exist in the graph or is created as a new node in the graph. A directed edge is then added from user A to this trust node and another directed edge added from the trust node to the user B. This represents user A trusting user B in the genre d. An additional trust node is created and a directed edge added from the trust node to the genre or context node in which user B trusts user C. A directed edge is added from User B to the trust node and another directed edge added from the trust node to user C. This represents user B trusting user C in the genre.

e. User C makes an explicit recommendation to user B in the genre that B trusts C f. Where the genre or context that user A trusts user B on is the same as the genre or context user B trusts user C the items recommended by user C to user B is served as a recommendation to User A.

According to a further embodiment, a recommendation is made to a User A, who trusts a User B on a particular genre or context and a User C who trusts User B on the same genre or context. When User B explicitly recommends an item within the genre or context of trust to User C, the same item is served as a recommendation to User A.

A method for making a recommendation to a User A who trusts a User B on a particular genre or context referred to as "genre T", where there is a User C who trusts User B on another genre, referred to as "genre K". If User A indicates trust for another user, User D, on "genre K", then when User B explicitly recommends an item within "genre K" to User C, the same item will be recommended to User A.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

A system includes one or more clients. The clients can be hardware and/or software (e.g., threads, processes, computing devices. The system also includes one or more servers. The servers can also be hardware and/or software e.g., threads, processes, computing devices. The servers can house threads to perform transformations by employing the components described herein, for example. One possible communication between a client and a server may be in the form of a data packet adapted to be transmitted between two or more computer processes. The system includes a communication framework that can be employed to facilitate communications between the clients and the servers. The clients are operatively connected to one or more client data stores that can be employed to store information local to the clients. Similarly, the servers are operatively connected to one or more server data stores that can be employed to store information local to the servers.

It will be understood by all readers of this written description that the exemplary embodiments described and claimed herein may be suitably practiced in the absence of any recited feature, element or step that is, or is not, specifically disclosed herein.

Although illustrative embodiments have been described in detail, it is to be understood that the claimed subject matter is not limited to those precise embodiments, and that various changes and modifications can be effected therein by one skilled in the art without departing from the scope and spirit of the disclosed embodiments as defined by the appended claims.

What is claimed is:

1. A computer-implemented method of supplying a recommendation for an item, the method comprising:
receiving, at a processor and from a computing device of a first user, a selection or contacts from a contact list;
generating, by the processor and based on the selection of contacts, a graph comprising:
a first user node associated with the first user; and
a second user mode associated with a second user, the second user being a first contact from the selection of contacts;
responsive to receiving data that the first user has trust in the second user with respect to a genre, providing:
a first genre node associated with the genre;
a first trust node;

a first has-trust arc from the first user node to the first trust node;
a first trusts-in arc from the first trust node to the second user node; and
a first trusted-genre arc from the first trust node to the genre node;
responsive to receiving data that an item belongs to the genre, providing, based at least in part on the data:
an item node associated with the item; and
a first genre arc from the item node to the genre node;
responsive receiving recommendation data indicating a recommendation of the item from the second user, generating an implicit recommendation for the item, the implicit recommendation based on at least in part on the first trust node and the recommendation of the item from the second user;
generating an implicit recommendation arc from the item node to the first user node;
outputting, by the processor and to the computing device, the implicit recommendation.

2. The method of claim 1,
the method further comprising:
responsive to receiving data that indicates that the first user knows the second user, generating a first knows arc that connects the first user node and the second user node.

3. The method of claim 1, wherein
the recommendation data includes a high rating of the item by the second user.

4. The method of claim 1, the method further comprising:
generating a recommendation for the item, the recommendation based at least in mart on receiving recommendation data indicating a recommendation of the item by the second user to a third user;
generating a recommendation arc from the second user node through the Item node and to a third user node associated with the third user;
responsive to receiving data indicative of trust between the second user and the third user;
generating, based on the data indicative of trust between the second user and the third user:
a second trust node;
a second has-trust arc that connects the second user node with the second trust node;
a second trusts-in arc that connects the second trust node the third user node;
a second trusted-genre arc from the second trust node to the genre node; and
a second knows arc between the second user node and the third user node.

5. A computer-implemented method of supplying a recommendation for an item, the method comprising:
receiving, at a processor and from a computing device of a first user, a selection of contacts from a contact list;
generating, by the processor and based at least in part on the selection of contacts, a graph including:
a first user node associated with the first user;
a second user node associated with a second user;
a third user node associated with a third user; and
a fourth user node associated with a forth user;
responsive to receiving a first set of data indicating that the first user trusts the second user with respect to a first genre, generating, based at least in part on the first set of data:
a first genre node associated with the first genre;
a first trust node;
a first has-trust arc from the first user node to the first trust node;
a first trusts-in arc from the first trust node to the second user node; and
a first trusted-genre arc from the first trust node to the first genre node:
responsive to receiving a second set of data indicating that the second user has trust is the third user with respect to a second genre, generating, based at least in part on the second set of data:
a second genre node associated with the second genre;
a second trust node;
a second has-trust arc from the second user node to the second trust node;
a second trust-in arc from the second trust node to the third user node; and
a second trusted-genre arc from the second trust node to the second genre node;
receiving data indicating that an item belongs to the second genre;
generating, based at least in part on the data indicating that an item belongs to the second genre;
an item node associated with the item; and
a first are arc from the item node to the second genre node:
responsive to receiving a third set of data indicating that the first user trusts a fourth user with respect to the first genre, generating, based at least in part on the third set of data;
a third trust node;
a third has-trust arc that connects the first user node to the third trust node;
a third trusts-in arc that connects the third trust node to the fourth user node; and
a third trusted-genre arc from the third trust node to the second genre node;
responsive to receiving recommendation data indicating a recommendation of the item from the second user to the third user:
generating a recommendation arc from the second user node to the third user node through the item node;
generating an implicit recommendation for the item, the implicit recommendation based at least in part on the second and third trust nodes, and the recommendation of the item from the second user to the third user;
generating an implicit recommendation arc from the item node to the first user node; and
outputting the implicit recommendation to the first user.

6. The method of claim 5 further comprising:
responsive to receiving data that the first user knows the second user, providing a first knows arc that connects the first user node to the second user node.

7. The method of claim 5 further comprising:
responsive to receiving data that the second user knows the third user, providing a second knows arc that connects the second user node to the third user node.

8. A computer-implemented method of supplying a recommendation for an item, the method comprising:
responsive to receiving, at a processor and from a computing device of a first user, a selection of contacts from a contact list, generating, based at least in part on the selection of contacts, a graph comprising:
a first user node associated with a first user;
a second user node associate with a second user,
a third user node associated with a third user, and
an item node associated with an item;

responsive to receiving data indicative of the item being associated with a genre, generating a first genre arc from the item node to a genre node, the genre node associated with the genre;

responsive to receiving recommendation data from the second user, the recommendation data including a recommendation for the item directed to the third user;

generating a recommendation arc from the second user node to the third user node through the item node;

generating, based at least in part on the recommendation data, a first recommendation arc from the second user node to the first item node;

generating, based at least in part on the recommendation data, a second recommendation arc from the item node to the third user node; and generating, based at least in part on at least the recommendation data, an implicit recommendation of the item to the first user;

outputting the implicit recommendation to the first user.

9. The method of claim 8, further comprising:
responsive to receiving data that the first user knows the third user, generating, based at least in part on the data, a first knows arc that connects the first user to the second user.

10. The method of claim 8, further comprising:
responsive to receiving data that the second user knows the third user, generating, based at least in part on the data, a first knows arc that connects the second user to the third user.

11. The method of claim 8, further comprising:
responsive to receiving data that the first user trusts the third user with regard to the genre, generating, based at least in part on the data:
a first trust node;
a first has-trust arc, the first has-trusts arc connects the first user node to the first trust node;
a first trusts-in arc, the first trusts-in arc connects the first trust node to the third user node; and
a first trusted-genre arc, the first trusted genre are connects the first trust node to the genre node.

12. The method of claim 8, further comprising:
responsive to receiving data that the second user trusts the third user with regard to the genre, generating, based at least in part on the data:
a first trust node;
a first has-trust arc, the first has-trusts arc connects the second user node to the first trust node;
a first trusts-in arc, the first trusts-in arc connects the first trust node to the third user node; and
a first trusted-genre arc, the first trusted genre arc connects the first trust node to the genre node.

13. The method of claim 8, further comprising:
responsive to receiving data that the third user trusts the first user with regard to the genre, generating, based at least in part on the data:
a first trust node;
a first has-trust arc, the first has-trusts are connects the third user node to the first trust node;
a first trusts-in arc, the first trusts-in arc connects the first trust node to the first user node; and
a first trusted-genre arc, the first trusted genre arc connects the first trust node to the genre node.

14. The method of claim 8, further comprising:
receiving data that the third user trusts the second user in regard to the genre, generating, based on the data:
a first trust node;
a first has-trust arc, the first has-trusts arc connects the third user node to the second trust node;
a first trusts-in arc, the first trusts-in arc connects the first trust node to the second user node; and
a first trusted-genre arc, the first trusted genre arc connects the first trust node to the genre node.

15. The method of claim 8 wherein the recommendation data Includes a high-rating of the item.

16. The method of claim 8 wherein the item is a product a content item or a service.

17. The method of claim 1 wherein a recommendation of the Item by the first user does not exist.

18. The method of claim 11 wherein the implicit recommendation is based at least in part on the recommendation from the second user of the item and the first trust node.

19. The method of claim 14 wherein the implicit recommendation is based at least in part on the recommendation from the second user to the third user of the item and the first trust node.

* * * * *

UNITED STATES PATENT AND TRADEMARK OFFICE
CERTIFICATE OF CORRECTION

PATENT NO. : 10,440,143 B2  
APPLICATION NO. : 15/387563  
DATED : October 8, 2019  
INVENTOR(S) : Bentil et al.

Page 1 of 1

It is certified that error appears in the above-identified patent and that said Letters Patent is hereby corrected as shown below:

On the Title Page

Item (71), delete "(MR)" and insert --(MU)--.

Item (73), delete "(MR)" and insert --(MU)--.

Signed and Sealed this
Twenty-sixth Day of November, 2019

Andrei Iancu
*Director of the United States Patent and Trademark Office*